E. FERREN.
Devices for Laying and Joining Pipe.
No. 151,482. Patented June 2, 1874.
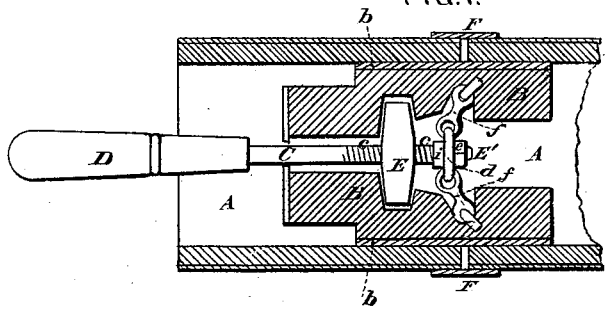
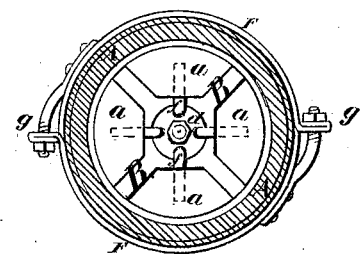
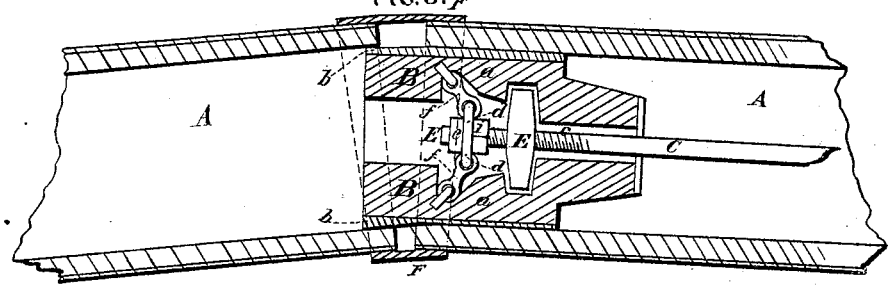
WITNESSES
INVENTOR.
Ebenezer Ferren
per A. L. Durgin
ATTY.

UNITED STATES PATENT OFFICE.

EBENEZER FERREN, OF MANCHESTER, NEW HAMPSHIRE.

IMPROVEMENT IN DEVICES FOR LAYING AND JOINING PIPE.

Specification forming part of Letters Patent No. 151,482, dated June 2, 1874; application filed March 23, 1874.

*To all whom it may concern:*

Be it known that I, EBENEZER FERREN, of Manchester, in the county of Hillsborough and State of New Hampshire, have invented a new and Improved Machine for Use in Laying Pipe for Water or other uses, of which the following is a specification:

In the laying of water-pipe much difficulty has been met in filling up the joints or cracks between the sections, and in keeping the continuous even internal diameter of the pipe. Where cement pipe is used, as is done to a great extent for the conveyance of water in streets, it is with great difficulty they can be packed in the joint, so as to remain tight and save the annoyance of constant repairs. My invention is designed to obviate this difficulty; and consists in an expanding cylinder that can be readily inserted in the ends of pipe to be joined, and then expanded so as to bring the pipe in line internally and hold it in position for the packing in the joints, as will be more fully set forth hereafter.

Figure 1 is a longitudinal section of the apparatus applied to the pipe. Fig. 2 is a transverse section of the same through the line $x\,x$; and Fig. 3 is a longitudinal section, showing the pipes set angularly to one another.

A A are two portions of pipe, the ends of which are to be joined. B is an expansible cylinder, composed of segments $a\,a$, surrounded by the elastic sheathing or band $b$. C is a rod, of any desired length, provided at one extremity with a handle, D, by which it is rotated, and at the other end formed into a screw, $c$. E is a screw collar or nut supported in recesses cut in the segments $a\,a$ of the cylinder, and incapable of rotating, and through which the screw $c$ passes and works. E' is a toggle-joint arrangement, consisting of the disk $d$, swiveled, by means of the nut $e$ and collar $i$, to the extremity of the screw-rod C, and links or hinges $f\,f$, which are jointed to the disk $d$ and to the segments $a\,a$ of the cylinder. It will thus be seen that as the screw-rod is turned down the toggle-joint will be forced nearer in a straight line and the segments moved out, thus expanding their elastic sheathing, which, when the pressure of the screw is released, returns the segments to their normal position and contracts the cylinder. The ends of the cylinder are properly closed, so as to prevent sand, cement, water, and other matter from entering and clogging the mechanism. F is an expansible band encircling the pipes at their joint. This band may consist of a single strip, the ends of which can be drawn together by a screw and nut, as shown at $g$, Fig. 2; or this band may be composed of sections, two or more in number, held together by a similar screw and nut arrangement, so as to be capable of being fitted on pipes of any diameter. Fig. 3 shows two sections of pipe to be joined at a slight angle to one another. In this instance the band F is constructed to accommodate this slight angularity.

In constructing the joint, the two extremities of the pipes to be joined are brought within the desired proximity to each other. The cylinder B is then inserted, as shown in Fig. 1, a portion being in each pipe. The handle is then turned and the cylinder expanded till it fits the bore of the pipe, which operation holds the pipes firmly in position for being jointed. The space between the ends of the pipes is then filled with the cementing material, which is supported on the cylinder serving as a core. The joint having been completely filled, the band F is applied over it, and on being tightened up by the nut, the cement is compressed in the joint and any superfluous quantity forced out, thus making a dense and neat joint both internally and externally. In laying the pipes at angles to one another the operation is substantially the same, only that the cylinder occupies less of the pipe opposite the one in which it is introduced, as shown in the drawing, Fig. 3.

It is evident that my invention is applicable to all joints made with plastic material and extending through the pipe, and I do not confine myself to its use in water-pipes.

I claim—

The cylinder B, composed of the segments $a$, spindle C, cross-head E, expansible joints $f$, and the casing $b$, constructed and operating substantially in the manner and for the purposes described and set forth.

EBENEZER FERREN.

Witnesses:
S. N. BELL,
JOHN B. MILLS.